(12) United States Patent
Pariseau et al.

(10) Patent No.: US 9,141,094 B2
(45) Date of Patent: Sep. 22, 2015

(54) PERSONAL AIR QUALITY MONITORING SYSTEM

(71) Applicant: Particles Plus, Inc., Canton, MA (US)

(72) Inventors: David Pariseau, Los Altos, CA (US); Adam Giandomenico, Walpole, MA (US)

(73) Assignee: Particles Plus, Inc., Stoughton, MA (US)

(*) Notice: Subject to any disclaimer, the term of this patent is extended or adjusted under 35 U.S.C. 154(b) by 0 days.

(21) Appl. No.: 14/214,870

(22) Filed: Mar. 15, 2014

(65) Prior Publication Data

US 2014/0277624 A1    Sep. 18, 2014

Related U.S. Application Data

(60) Provisional application No. 61/786,667, filed on Mar. 15, 2013.

(51) Int. Cl.
*G01N 15/02* (2006.01)
*G05B 11/01* (2006.01)

(52) U.S. Cl.
CPC .................................. *G05B 11/01* (2013.01)

(58) Field of Classification Search
CPC .......... G01N 15/0205; G01N 15/0211; G01N 15/1459; G01N 2021/4716; G01N 15/1434
USPC ......................................................... 356/335
See application file for complete search history.

(56) References Cited

U.S. PATENT DOCUMENTS

| | | | |
|---|---|---|---|
| 2004/0068389 A1* | 4/2004 | Kleefstra | 702/155 |
| 2006/0071803 A1* | 4/2006 | Hamburger et al. | 340/630 |
| 2010/0264301 A1* | 10/2010 | Borosak | 250/252.1 |

* cited by examiner

*Primary Examiner* — Tarifur Chowdhury
*Assistant Examiner* — Md Rahman

(57) ABSTRACT

A personal air quality monitoring system worn or carried by a user. Such system can be used to monitor the local air quality and alert a user should air quality deteriorate below some acceptable desired or configurable threshold.

20 Claims, 6 Drawing Sheets

PERSONAL AIR QUALITY MONITORING SYSTEM

CROSS-REFERENCE TO RELATED APPLICATION

This application claims priority to U.S. Provisional Application Ser. No. 61/786,667 filed on Mar. 15, 2013, titled PERSONAL AIR QUALITY MONITORING SYSTEM by inventors David Pariseau and Adam Giandomenico, the entire disclosure of which is hereby incorporated herein by reference.

This application is related to and incorporates by reference U.S. Non-Provisional application Ser. No. 14/214,899, filed herewith on Mar. 15, 2014, titled PARTICLE COUNTER WITH INTEGRATED BOOTLOADER by inventor David Pariseau; U.S. Non-Provisional application Ser. No. 14/214,903, filed herewith on Mar. 15, 2014, titled MIXED-MODE PHOTO-AMPLIFIER FOR PARTICLE COUNTER by inventors David Pariseau and Ivan Horban; U.S. Non-Provisional application Ser. No. 14/214,876, filed herewith on Mar. 15, 2014, titled MULTIPLE PARTICLE SENSORS IN A PARTICLE COUNTER by inventor David Pariseau; U.S. Non-Provisional application Ser. No. 14/214,889, filed herewith on Mar. 15, 2014, titled INTELLIGENT MODULES IN A PARTICLE COUNTER by inventor David Pariseau; U.S. Non-Provisional application Ser. No. 14/214,895, filed herewith on Mar. 15, 2014, titled PULSE SCOPE FOR PARTICLE COUNTER by inventor David Pariseau; and U.S. Non-Provisional application Ser. No. 14/214,907, filed herewith on Mar. 15, 2014, titled PULSE DISCRIMINATOR FOR PARTICLE COUNTER by inventors David Pariseau and Ivan Horban.

BACKGROUND OF THE INVENTION

With the increase of miniaturization of portable electronic products like heart-rate monitors, sophisticated pedometers, glucose monitors, insulin pumps, electroencephalographs integrated with smart-phones, etc. People are increasingly carrying sophisticated instrumentation on or about their persons. Couple this with the increase of people with respiratory problems, and the growing proliferation of medicines, filtration equipment, masks, etc., there is a compelling case for creating a product that would alert the user to conditions that might aggravate respiration or bring-on asthma or other such attacks.

Referring now to FIG. 1, shown are recent figures from the Center for Disease Control (CDC) regarding the current state of asthma (a widespread respirator condition).

The number of people with asthma continues to grow. One in 12 people (about 25 million, or 8% of the population) had asthma in 2009, compared with 1 in 14 (about 20 million, or 7%) in 2001.

More than half (53%) of people with asthma had an asthma attack in 2008. More children (57%) than adults (51%) had an attack. 185 children and 3,262 adults died from asthma in 2007.

About 1 in 10 children (10%) had asthma and 1 in 12 adults (8%) had asthma in 2009. Women were more likely than men and boys more likely than girls to have asthma.

About 1 in 9 (11%) non-Hispanic blacks of all ages and about 1 in 6 (17%) of non-Hispanic black children had asthma in 2009, the highest rate among racial/ethnic groups.

The greatest rise in asthma rates was among black children (almost a 50% increase) from 2001 through 2009.

Therefore what is needed is a system and method that allows an individual to monitor particles that affect an individual.

SUMMARY

In accordance with the various aspects and embodiments of the present invention, a system and method are disclosed that allow an individual to monitor particles that affect an individual. The foregoing is a summary and thus includes, by necessity, simplifications, generalizations and omissions of detail. Those skilled in the art will appreciate that the summary is illustrative only and is not intended to be in any way limiting.

BRIEF DESCRIPTION OF THE DRAWINGS

The foregoing summary as well as the following detailed description is better understood when read in conjunction with the appended drawings. For the purpose of illustrating the invention, there is shown in the drawings exemplary constructions of the invention; however, the invention is not limited to the specific various aspects, embodiments, methods and instrumentalities disclosed in the drawings.

DETAILED DESCRIPTION

Figure 1:
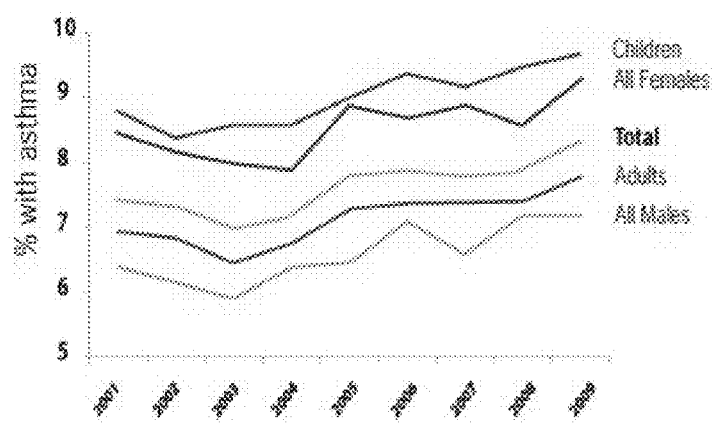
FIG. 1 shows a graph for figures from the Center for Disease Control (CDC) regarding the current state of asthma.

It is noted that, as used in this description, the singular forms "a," "an" and "the" include plural referents unless the context clearly dictates otherwise. Reference throughout this specification to "one aspect," "another aspect," "at least one aspect," "various aspects," "further aspect," "one embodiment," "an embodiment," "certain embodiments," or similar language means that a particular aspect, feature, structure, or characteristic described in connection with the embodiment or embodiments is included in at least one aspect or embodiment of the present invention. Thus, appearances of the phrases "in accordance with one aspect," "in accordance with various aspects," "in accordance another aspect," "one embodiment," "in at least one embodiment," "in an embodiment," "in certain embodiments," and similar language throughout this specification may, but do not necessarily, all refer to the same embodiment.

In accordance with the various aspects of the present invention, a device includes a computing device. As referred to herein, the devices may be part of a system or the system. It may be implemented to include a central processing unit (e.g., a processor), memory, input devices (e.g., keyboard and pointing devices), output devices (e.g., display devices), and storage device (e.g., disk drives). The memory and storage device are computer-readable media that may contain instructions or code that, when executed by the processor or the central processing unit, cause the device to perform certain tasks. In addition, data structures and message structures may be stored or transmitted via a data transmission medium, such as a signal on a communications link. Various communications channels may be used (e.g., the Internet, a local area network (LAN), a wide area network (WAN), or a point-to-point dial-up connection, or any other wireless channel or protocol) to create a link.

In accordance with the various aspects of the present invention, the device or system may be use various computing systems or devices including personal computers, server computers, hand-held or laptop devices, multiprocessor systems, microprocessor based systems, programmable consumer electronics, network personal computers (PCs), minicomputers, mainframe computers, distributed computing environments that include any of the above systems or devices, and the like. In accordance with the various aspects of the present invention, the device or system may also provide its services to various computing systems such as personal computers, cell phones, personal digital assistants, consumer electronics, home automation devices, and so on.

In accordance with the various aspects of the present invention, the device or system may be described in the general context of computer-executable instructions, such as program modules or code, which is executed by one or more computers or devices. Generally, program modules include routines, programs, objects, components, data structures, and so on that perform particular tasks or implement particular data types. Typically, the functionality of the program modules may be combined or distributed as desired in various embodiments.

Particles affect the performance of athletes and individuals that suffer from a medical condition. Particles affect everyone, since at some threshold an individual is susceptible. Thus, an early warning indication of particulates above some threshold would allow individuals to make informed decisions about changing their environment or circumstances and thereby perhaps avoid compromising their health or having to take medications to alleviate symptoms or conditions exacerbated by particulates. Particles may include pollutants as well as naturally occurring particles, such as like pollen etc., which pose health issues. It would be an advance in the art of particulate detection to provide data about particles in an individual's ambient environment to the individual.

A device that a user carried on or about his or her person, that monitored the local air quality and provided early warning of worsening air quality would allow the user to take measures to avoid being exposed to the environment and thereby avoid episodes of compromised or aggravated respiration, and perhaps also eliminate the need to take medications to alleviate such.

Particle counters are typically used in manufacturing or industrial applications to measure particulate quantities in air, gases or liquids. Typically such counters also bin particulates by size. These size bins vary by application and often by instrument. A particle counter has at least one size channel and popular counters can have 6 or more channels. Typically these size channels discriminate pulses based on the pulse height of the incoming signal. The pulse height referring to the peak voltage of the signal. Sometimes there is also rudimentary discrimination of pulse width, often in hardware.

Figure 2:
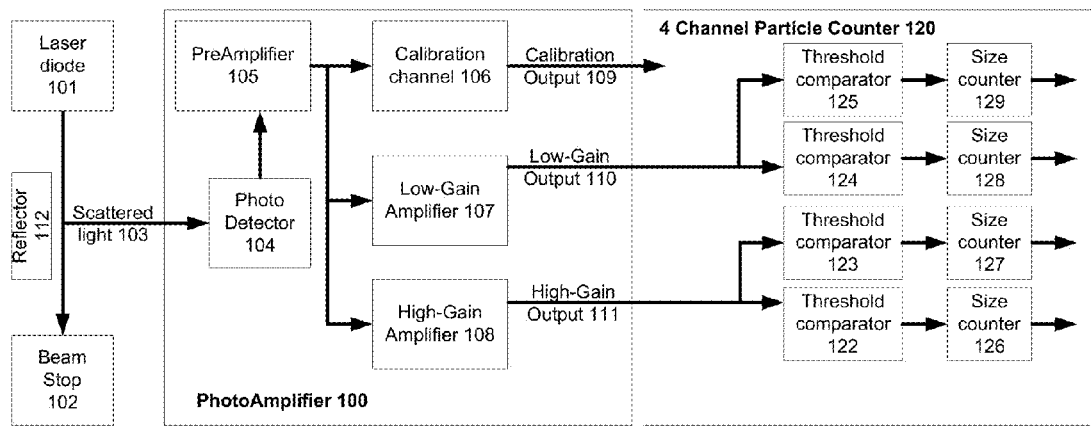
FIG. 2 shows a system in accordance with the various aspects of the present invention.

Referring now to FIG. 2, illustrated is one implementation of a particle counter used in manufacturing or industrial applications. In this example a beam present between the laser diode (101) and the beam stop (102) scatters light (103) as particles cross that beam. Typically the scattered light (103) is focused by a Reflector (112) onto the face of a photo-diode (104) on a photo-amplifier board (100). The tiny current in the photo-diode is then pre-amplified, usually by a trans-impedance amplifier (105). The pre-amplified signal is usually available on a calibration channel (106) for use during calibration. The pre-amplifier (105) signal is also sent to one or more amplifiers. In this case there are two, a low-gain channel (107) and a high-gain channel (108). These amplifiers further increase the signal amplitude and transmit send it, often, to a separate particle counting board (120). On this board the incoming pulse signals are sorted into size bins. In this example there are four channels, two channels (122,123) connected to the high-gain amplifier (111) and two channels (124,125) connected to the low-gain amplifier (110). The threshold comparators (122,123,124,125) are setup during the calibration phase so that they each channel counts pulses above some threshold. This can be a manual process with manual adjustment of a potentiometer, or a programmatic process where firmware would set a digital potentiometer or digital-to-analog converter. The counter outputs (126,127, 128,129) would then be read by microcontroller and displayed to the user.

In certain embodiments, an air quality monitoring system, such as a portable particle detection system, is worn or carried by a user to provide real-time monitoring of the air quality in their local environment.

Figure 3:
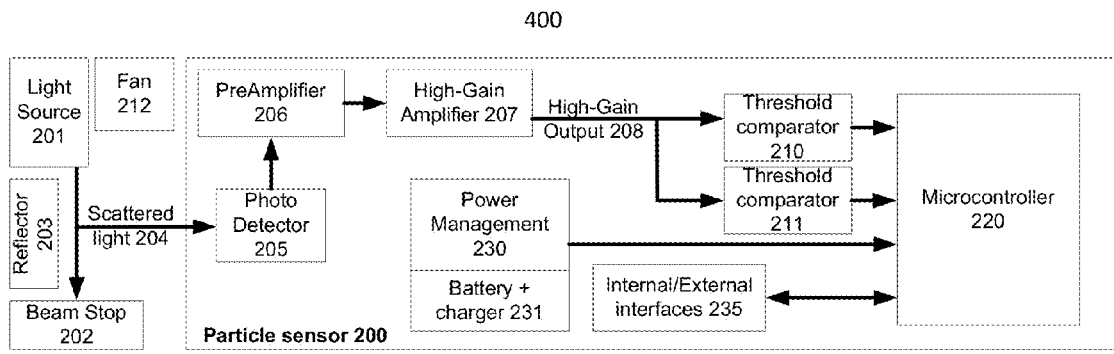
FIG. 3 shows a system in accordance with the various aspects of the present invention.

Referring now to FIG. 3, illustrated is an embodiment of an air quality monitoring system (400), also referred to as "personal particle counter" or "personal counter" or "personal counter device." Here, air is passed through a light beam generated by a light source (201) where particles scatter light (204). The airstream is generated by a fan or blower (212) or some other air impeller where air is drawn or pushed into the enclosure and is routed in such a way as to pass through the beam. In certain embodiments, the light source is a laser diode, a light-emitting-diode, or the equivalent. The light is focused by a lens to create a ribbon of light through which the airstream passes, in order to provide controlled scattering of light by particle size. In another implementation, a light blocking system is utilized, in which a beam is presented to a photo-diode and particles obscure the beam as they pass through it, thereby providing the signal.

In the case of a light-scattering system. Light scattered by particles in the stream (204) gets collected by a reflector (203) and presented to the photo-detector (205) and the resulting signal is amplified by the pre-amplifier stage (206), such as a trans-impedance amplifier. In some cases a second amplification (207) is utilized and the resulting electrical signal is used to drive one or more threshold comparators (210, 211). The outputs of the threshold comparators (210, 211) is used as inputs to counter channels within the microcontroller (220). These counts are used to determine the quality of the air. In this case there are two separate channels, which could be setup to different counts for particles of different sizes.

The air quality monitoring system (400) is powered locally by a battery (231), which is charged from some external power source. A large number of charging techniques are possible including, but not limited to: an external power connector, power from some external wired interface, wireless (inductive) charging, a solar cell, local charging from energy harvesting means. The battery power is managed locally via the Power Management circuit (230) that provided regulated power to the on-board circuitry (including the analog circuits (amplifiers, comparators, etc.)) and the digital circuitry (microcontroller, internal/external interfaces).

Here, the Internal/External user interfaces (235) is communicatively coupled to the threshold comparator. In certain embodiments, the Internal/External user interfaces (235) comprise one or more of these non-limiting features:

an on-board display, liquid-crystal-display (LCD) or other, to display current air quality status, air-quality over time, cumulative particulate mass, graphs, charts, etc. or other air quality, an on-board memory (volatile or non-volatile) to store or log historic air quality data (for display use or later retrieval and reporting or analysis), an on-board eccentric-rotating-mass (ERM) motor, to provide vibration to alert or interface with user, an on-board audio transducer, to provide sound to alert or interface with user, one or more push-buttons on-board, to interface with user, an on-board wired interface channel for communication with external devices, an on-board wired interface to allow the battery to be charged, and an on-board wireless communications interface channel for communication with external devices.

Figure 4:
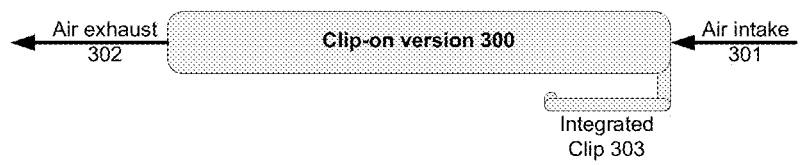
FIG. 4 shows a clip-on device incorporating a system in accordance with the various aspects of the present invention.

The above gives a general overview of the invention with some of the interface options. In certain embodiments, the air quality monitoring system (400) is embodied in a carrying means that takes on the structure of any of a plurality of form-factors, not limited by the examples provided below:

Referring to FIG. 4, a clip-on version (300) is shown. In this embodiment, the device has an integrated clip (303) which can be implemented a large number of ways: molded piece of deformable material, spring tensioned pivot, etc. In this example the air enters the unit on the right (301) and exits the device on the left (302). Though the example describes an integrated clip (where it is part of the enclosure), it could also just as easily be implemented with a clip mounted to an external holder that is used to capture and carry the device.

Figure 5:
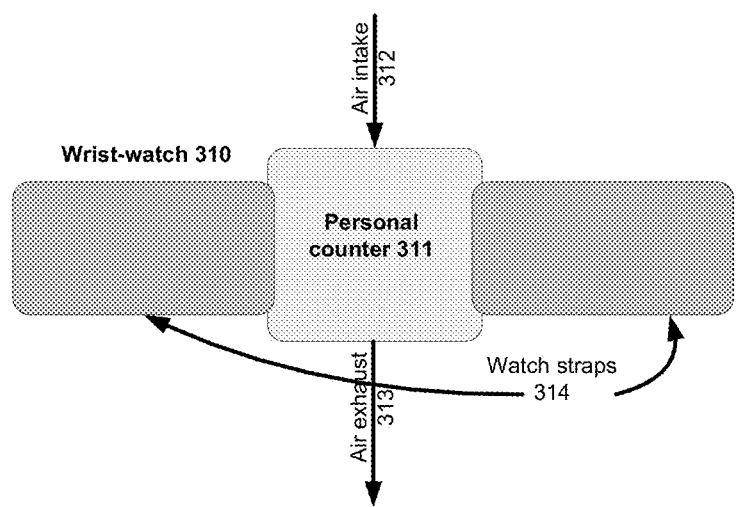
FIG. 5 shows a wrist watch incorporating a system in accordance with the various aspects of the present invention.

Referring now to FIG. 5, a wrist-watch or armband version (310) is shown. In this embodiment, the device is housed in a wristwatch type form factor with mounts to attach standard watch-bands (314). The air quality monitoring system (400), shown here as personal counter device (311), is configured to be worn on a wrist or arm of the person. In one embodiment, the personal counter device 331 takes the place a wristwatch, for example. Alternatively, the personal counter device 331 is integrated with a wristwatch to also provide time-keeping functionality. The air in this example enters from the top (312) and exits from the bottom (313).

Figure 6:
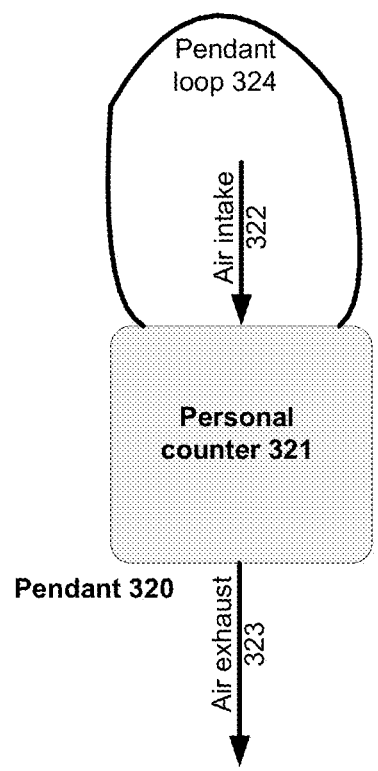
FIG. 6 shows a pendant incorporating a system in accordance with the various aspects of the present invention.

Referring now to FIG. 6, a pendant or necklace version (320) is shown. In this embodiment, the device is housed in a pendant form factor. The air quality monitoring system (400), shown here as the personal counter device (321), is hung from a pendant loop (324), which could be a chain, cord, string, or some other string-like material. In some implementations, the personal counter device (321) is also decorative as in a fashionable necklace or some such. In this example the air enters from the top (322) and exits from the bottom (323).

Figure 7:
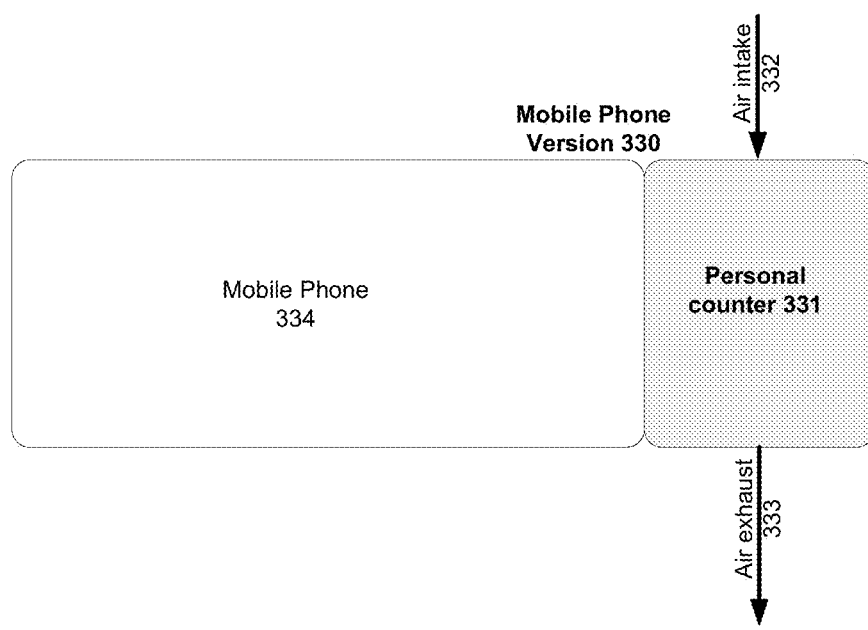
FIG. 7 shows a personal device incorporating a system in accordance with the various aspects of the present invention.

Referring now to FIG. 7, a personal device or Mobile-phone version (330) is shown. In this embodiment, the device is housed as an adjunct to or as a holder for a mobile or smart phone (334). In the example below, the personal counter device (331) is attached to the docking port of the Mobile Phone (334) in order to provide a wired interface. Alternatively or in combination, the personal counter 331 is molded into a holder for the phone and communicates with the phone wirelessly (via Bluetooth or WiFi for example). In this example the air enters from the top (332) and exits from the bottom (333).

In accordance with various aspects of the present invention, other possible embodiments include:

a broach form-factor that could be pinned or clipped to a garment or purse or something similar, a carrier to allow it to be mounted in a vehicle, a carrier to allow it to be mounted to a bicycle or motorbike, a carrier for a golf-cart, an armband that can be worn, perhaps during sporting activities or training, and in a pair of glasses, perhaps with a heads-up display projected on one or more lenses.

Again many embodiments are possible for such a personal device, and the above embodiments are meant only to provide a sense of this variety rather than to attempt to describe the entire scope of possible embodiments.

While various embodiments have been described above, it should be understood that they have been presented by way of example only, not limitation, and various changes in form and details may be made. Any portion of the device, instrument, apparatus and/or methods described herein may be combined in any combination, except mutually exclusive combinations. The aspects and embodiments described herein can include various combinations and/or sub-combinations of the functions, components and/or features of the different embodiments described. For example, multiple, distributed processing systems can be configured to operate in parallel.

Although the present invention has been described in detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

It will be apparent that various aspects of the present invention as related to certain embodiments may be implemented in software, hardware, application logic, or a combination of software, hardware, and application logic. The software, application logic and/or hardware may reside on a server, an electronic device, or be a service. If desired, part of the software, application logic and/or hardware may reside on an electronic device and part of the software, application logic and/or hardware may reside on a remote location, such as server.

In accordance with the aspects disclosed in the teachings of the present invention and certain embodiments, a program or code may be noted as running on a device, an instrument, a system, or a computing device, all of which are an article of manufacture. Additional examples of an article of manufacture include: a server, a mainframe computer, a mobile telephone, a multimedia-enabled smartphone, a tablet computer, a personal digital assistant, a personal computer, a laptop, or other special purpose computer each having one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform tasks and methods. Furthermore, an article of manufacture (e.g., device) includes a non-transitory computer readable medium having a series of instructions, such as computer readable program steps or code, which is encoded therein. In certain aspects and embodiments, the non-transitory computer readable medium includes one or more data repositories, memory, and storage, including non-volatile memory. The non-transitory computer readable medium includes corresponding computer readable program or code and may include one or more data repositories. Processors access the computer readable program code encoded on the corresponding non-transitory computer readable mediums and execute one or more corresponding instructions. Other hardware and software components and structures are also contemplated.

Unless defined otherwise, all technical and scientific terms used herein have the same meaning as commonly understood by one of ordinary skill in the art to which this invention belongs. Although any methods and materials similar or equivalent to those described herein can also be used in the practice of the present invention, representative illustrative methods and materials are described herein.

All publications and patents cited in this specification are herein incorporated by reference as if each individual publication or patent were specifically and individually indicated to be incorporated by reference and are incorporated herein by reference to disclose and describe the methods and/or system in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

All statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. A personal particle counter comprising:
   at least one airstream management module for moving air through at least one chamber;
   at least one light source, which is focused into a beam, that passes through the at least one chamber;
   at least one photo-detector within the at least one chamber that captures light scattered by airborne particulates passing through the beam;
   at least one amplifier in communication with the at least one photo-detector, the at least one amplifier converts signals from the at least one photo-detector into amplified electrical pulses;
   at least one threshold comparator that processes the amplified electrical pulses from the at least one amplifier and produces at least one output based on any pulse above a threshold, the threshold represents at least one particulate size channel;
   at least one microcontroller that processes the output from the at least one threshold comparator related to the at least one particulate size channel to count particles that pass through the chamber, where volume of air and light intensity are used in conjunction with the particles counted to infer particulate concentration for the at least one particulate size channel; and
   at least one interface in communication with the at least one microcontroller to perform, at least one of, store and communicate the collected information.

2. The personal particle counter in claim 1, wherein the at least one interface is an onboard display.

3. The personal particle counter of claim 1, wherein the at least one interface is a wireless external link.

4. The personal particle counter of claim 1, wherein the at least one interface is at least one of a wired external link or a docking port for a smartphone.

5. The personal particle counter of claim 1, wherein the at least one interface is a vibrating motor.

6. The personal particle counter of claim 1, wherein the at least one interface is an audio transducer.

7. The personal particle counter of claim 1 further comprising an integrated clip for clipping the personal particle counter to apparel or personal effects.

8. The personal particle counter of claim 1 further comprising an integrated wrist band allowing a user to wear the personal particle counter.

9. The personal particle counter of claim 1 further comprising a loop that allows the personal particle counter to be worn as a pendant.

10. The personal particle counter of claim 1, wherein the particles counted in the at least particulate size channel, for a sample, are used with the average mass of particles for the at least one particulate size channel, along with volume of air and light intensity, to determine particle mass for the at least one particulate size channel.

11. A personal particle counter comprising:
    at least one airstream management component that pulls or pushes air through the personal particle counter;
    at least one light source that is focused into a beam, the beam passes through at least one chamber;
    at least one photo-detector within the chamber, the photo-detector captures light blocked by airborne particulates passing through the beam;
    at least one amplifier in communication with the photo-detector, the amplifier converts signals from the photo-detector into amplified electrical pulses;
    at least one threshold comparator that processes the amplified electrical pulses from the amplifier to produce at least one output based on any pulse above a threshold, the threshold represents at least one particulate size channel;
    at least one microcontroller that processes the output from the threshold comparator related to the channel to count particles that pass through the chamber, where volume of air and light intensity are used in conjunction with particles counted to infer particulate concentration for the channel; and
    at least one interface in communication with the microcontroller to perform, at least one of, store and communicate the collected information.

12. The personal particle counter of claim 11, wherein the at least one interface is an onboard display.

13. The personal particle counter of claim 11, wherein the at least one interface is a wireless external link.

14. The personal particle counter of claim 11, wherein the at least one interface is, at least one of, a wired external link and docking port for a smartphone.

15. The personal particle counter of claim 11, wherein the at least one interface is a vibrating motor.

16. The personal particle counter of claim 11, wherein the at least one interface is an audio transducer.

17. The personal particle counter of claim 11 further comprising an integrated clip for clipping the personal particle counter to apparel or personal effects.

18. The personal particle counter of claim 11 further comprising an integrated wrist band allowing a user to wear the personal particle counter.

19. The personal particle counter in claim 11 further comprising a loop that allows the personal particle counter to be worn as a pendant.

20. The personal particle counter of claim 11, wherein the particles counted in the channel, for a sample, are used with the average mass of particles for the channel, along with volume of air and light intensity, to determine particle mass for the channel.

* * * * *